May 20, 1941.  E. ZIPPER  2,242,986
WHEEL
Filed May 20, 1939  3 Sheets-Sheet 1

Inventor:
Emil Zipper
By Young, Emery & Thompson
Attorneys

May 20, 1941.  E. ZIPPER  2,242,986
WHEEL
Filed May 20, 1939  3 Sheets-Sheet 2
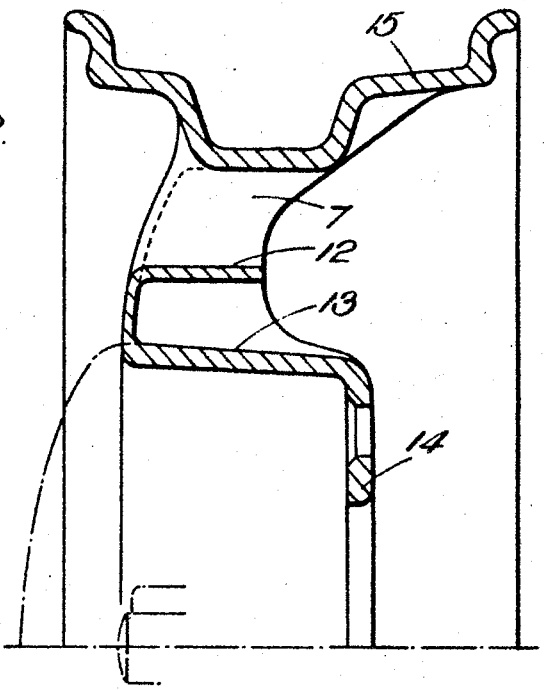
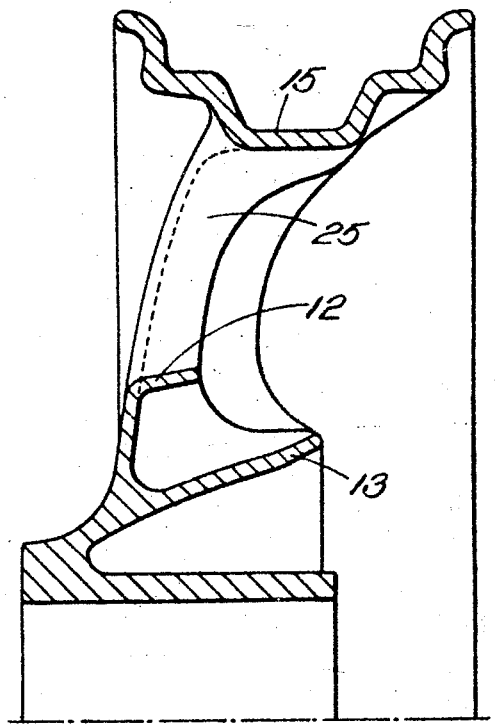
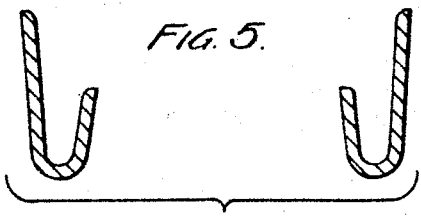
Inventor:
Emil Zipper
By Young, Emery & Thompson
Attorneys

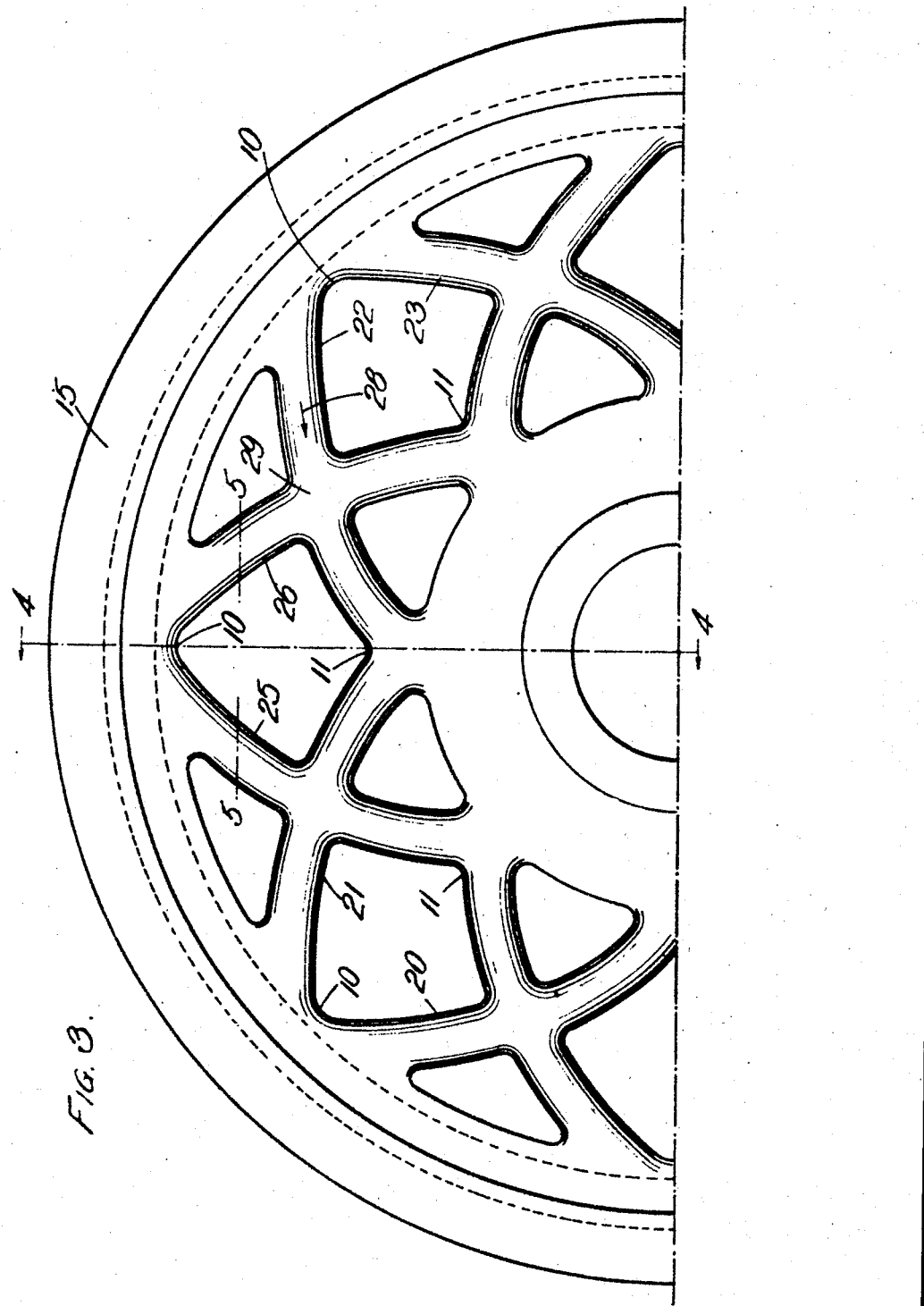

Patented May 20, 1941

2,242,986

UNITED STATES PATENT OFFICE 2,242,986

WHEEL

Emil Zipper, Paris, France

Application May 20, 1939, Serial No. 274,833
In Great Britain May 27, 1938

8 Claims. (Cl. 301—65)

This invention relates to wheels of the kind having spokes or spoke-like members or reinforcements formed by casting, pressing, or otherwise. The term "spokes" hereinafter used is intended to include such members or reinforcements. The invention is more particularly but not essentially concerned with metal wheels.

According to the invention the spokes or some of them are arranged in pairs with their inner ends spaced apart and their outer ends merging into each other or very close together so that the spokes of each pair are disposed at opposite angles to the adjacent wheel radius. It is possible with such an arrangement to obtain increased strength both against radial and tangential loads, and an unusually artistic arrangement of spokes can be provided. The spokes of each pair may be bowed in the form of an arch. The inner ends of each pair may be close to or merge into the inner ends of the adjacent pairs of spokes. The pairs of spokes may merge into other spokes in a cruciform arrangement, preferably so that the load partly at least is transmitted along the outer ends of each spoke (or each of some spokes) to the apex of curvature of another curved spoke on to the outside of its curve so that the latter spoke bears such load in the form of a bridge. The spokes may be arranged so that they all take the form of a bridge in this manner. The various adjacent ends of pairs of spokes may be arranged equidistantly around the wheel rim and the adjacent inner ends similarly may be spaced apart equally around the hub. The wheel may be formed by casting, pressing or otherwise, and may be in one piece, or the spokes and rim only may be in one piece, or the wheel may be built up in sections. The spokes may be of about U-shaped cross-section with one limb deeper than the other.

The invention will now be described by way of example with reference to the accompanying drawings, wherein—

Figure 2 is a sectional view on line 2—2 on Figure 1;

Figure 3 is a half outside side elevation of another wheel made in accordance with the invention;

Figure 4 is a sectional view on the line 4—4 on Figure 3; and

Figure 5 is a sectional view on line 5—5 on Figure 3.

Figure 6 is a cross sectional view showing a modified spoke construction.

Figure 1:
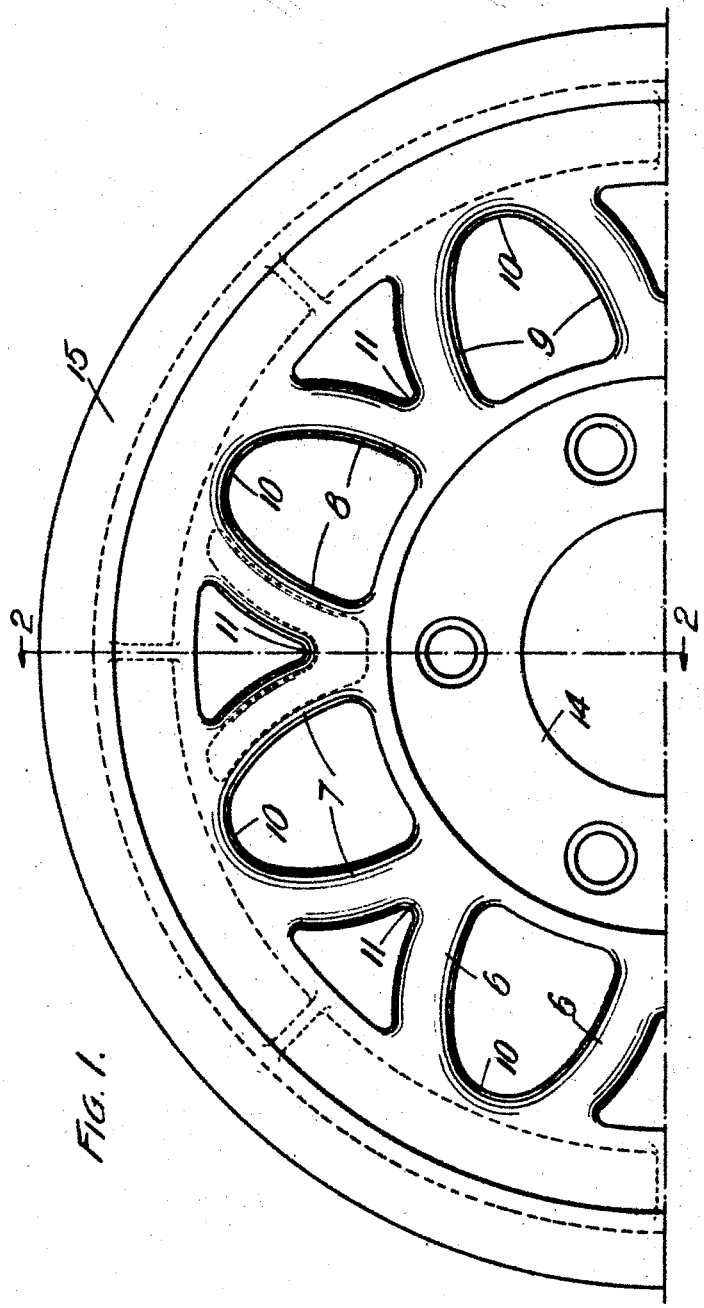
Figure 1 is a half outside side elevation of a wheel made in accordance with the invention.

In Figure 1 the pairs of spokes 6, 6; 7, 7; 8, 8; and 9, 9; are of similar design with the outer ends of each pair merging into each other at the positions 10. The inner end of each spoke merges into the adjacent inner end of the next spoke at the positions 11. The positions 10 are equidistantly spaced around the rim 15 and the positions 11 are equidistantly spaced around the hub flange 14. The spokes are curved and each pair forms an arch or bridge taking part of the load at its apex. The spokes are of U-shaped cross section, the limb 13 of which carries the usual flange 14 for bolting to the hub or axle. The rim 15 may be of any usual form and the spokes are integral therewith.

In the arrangement shown in Figures 3, 4 and 5, the pairs of spokes 20, 21 and 22, 23 comprise a set of spokes similar to those shown in Figure 1. The pairs of spokes 25, 26 comprise a similar set each crossing a spoke of the first set. Each spoke thus crosses and is crossed by another at the apex of its curvature so as to take load at its apex on the outside of its curve in the manner of an arch or bridge. For example load in the direction of the arrow 28 is partly transmitted to the spoke 26 at its apex 29. The positions 10, 11, are arranged similarly to the corresponding parts in Figure 1. The cross-sectional formation of the spokes as shown in Figure 5 is substantially U-shaped with one limb longer than the other. The limbs may, however, be of equal depth. Alternatively the spokes may have a roughly T-shaped cross-section about as shown in Figure 6.

I claim:

1. A wheel of the character described, comprising a hub, a rim, and a plurality of curved spokes arranged in pairs and extending between said hub and rim, the inner ends of each pair of spokes being spaced apart and the outer ends of each pair being merged together so that the spokes of each pair are disposed generally at opposite angles to a radius between them, said spokes of each pair being arranged with their concave portions facing each other.

2. A wheel of the character described, comprising a hub, a rim, and a plurality of spokes curved in the plane of the wheel arranged in pairs and extending between said hub and rim, the inner ends of each pair of spokes being spaced apart and the outer ends of each pair being merged together so that the spokes of each pair are disposed generally at opposite angles to a radius between them, the spokes of one pair intersecting and merging with spokes of other pairs in a cruciform arrangement.

3. A wheel of the character described, comprising a hub, a rim, and a plurality of rigid curved spokes of U-shaped cross section arranged in pairs and extending between said hub and rim, the inner ends of each pair of spokes being spaced apart and the outer ends of each pair being merged together so that the spokes of each pair are disposed generally at opposite angles to a radius between them, said spokes of each pair being arranged with their concave portions facing each other.

4. A wheel of the character described, comprising a hub, a rim, and a plurality of rigid spokes of U-shaped cross-section curved in the plane of the wheel arranged in pairs and extending between said hub and rim, the inner ends of each pair of spokes being spaced apart and the outer ends of each pair being merged together so that the spokes of each pair are disposed generally at opposite angles to a radius between them, the spokes of one pair intersecting and merging with spokes of other pairs in a cruciform arrangement.

5. A wheel of the character described, comprising a hub, a rim, and a plurality of curved spokes of T-shaped cross-section arranged in pairs and extending between said hub and rim, the inner ends of each pair of spokes being spaced apart and the outer ends of each pair being merged together so that the spokes of each pair are disposed generally at opposite angles to a radius between them, said spokes of each pair being arranged with their concave portions facing each other.

6. A wheel of the character described, comprising a hub, a rim, and a plurality of spokes of T-shaped cross-section curved in the plane of the wheel arranged in pairs and extending between said hub and rim, the inner ends of each pair of spokes being spaced apart and the outer ends of each pair being merged together so that the spokes of each pair are disposed generally at opposite angles to a radius between them, the spokes of one pair intersecting and merging with spokes of other pairs in a cruciform arrangement.

7. A wheel of the character described, comprising a hub, a rim, and a plurality of spokes curved in the plane of the wheel arranged in pairs and extending between said hub and rim, the inner ends of each pair of spokes being spaced apart and the outer ends of each pair being merged together so that the spokes of each pair are disposed generally at opposite angles to a radius between them, said spokes being arranged in two circumferential series of pairs, the inner ends of the pairs of one series merging with the inner ends of adjacent pairs of the same series, the merged inner ends of two adjacent pairs of one series lying between the inner ends of a pair of the other series, and the spokes of one series intersecting and merging with spokes of the other series in cruciform arrangement.

8. A wheel of the character described, comprising a hub, a rim, a plurality of spokes curved throughout their length regarded in the axial direction and arranged in pairs and extending between said hub and rim, the inner ends of each pair of spokes being spaced apart and the outer ends of each pair being merged together so that the spokes of each pair are disposed generally at opposite angles to a radius between them, and the inner ends of one pair of spokes merging with spokes of adjacent pairs, said spokes of each pair being arranged with their concave portions facing each other.

EMIL ZIPPER.